United States Patent
Pietrowicz

(10) Patent No.: US 9,733,274 B2
(45) Date of Patent: Aug. 15, 2017

(54) MULTI-FUNCTION ELECTRIC METER ADAPTER AND METHOD FOR USE

(71) Applicant: Vencore Labs, Inc., Basking Ridge, NJ (US)

(72) Inventor: Stanley Pietrowicz, Freehold, NJ (US)

(73) Assignee: Vencore Labs, Inc., Basking Ridge, NJ (US)

(*) Notice: Subject to any disclaimer, the term of this patent is extended or adjusted under 35 U.S.C. 154(b) by 1029 days.

(21) Appl. No.: 13/769,111

(22) Filed: Feb. 15, 2013

(65) Prior Publication Data

US 2013/0226485 A1    Aug. 29, 2013

Related U.S. Application Data

(60) Provisional application No. 61/600,222, filed on Feb. 17, 2012, provisional application No. 61/613,663, (Continued)

(51) Int. Cl.
*G01R 1/20* (2006.01)
*G01R 21/00* (2006.01)
(Continued)

(52) U.S. Cl.
CPC .............. *G01R 1/20* (2013.01); *G01R 21/00* (2013.01); *G01R 22/063* (2013.01); *H04L 41/12* (2013.01);
(Continued)

(58) Field of Classification Search
CPC .......... Y04S 30/14; Y04S 20/42; H04L 12/66; H04L 63/08; H04L 41/12; H04L 63/1416;
(Continued)

(56) References Cited

U.S. PATENT DOCUMENTS 6,282,546 B1    8/2001   Gleichauf et al.
6,324,656 B1    11/2001  Gleichauf et al.
(Continued)

FOREIGN PATENT DOCUMENTS

WO    WO 2006022594    3/2006
WO    WO 2011156914    12/2011

OTHER PUBLICATIONS

International Search Report and Written Opinion, International Application No. PCT/US2014/012970, mailing date May 19, 2014, 9-pages.
(Continued)

*Primary Examiner* — Toan Le
*Assistant Examiner* — Jeffrey Aiello
(74) *Attorney, Agent, or Firm* — Heslin Rothenberg Farley & Mesiti P.C.

(57) ABSTRACT

An adapter, and a method of using the adapter, for an electric meter, which includes a set of connections for interfacing to a panel box, a set of connectors for interfacing to the electric meter; and circuitry for intercepting FAN or HAN traffic, injecting FAN or HAN traffic and communicating intercepted traffic and local information from the electric meter and sensors over a network to a management entity that collects and process the data. Data from environmental, electric quality, and usage sensors are supplied to the network. External commands, originating in a management entity or with a customer are provided from the network. A computer readable non-transitory storage medium stores instructions of a computer program, which when executed by a computer system results in performance of steps of a method for intercepting FAN or HAN traffic, injecting FAN or HAN traffic, transmitting intercepted FAN or HAN traffic or utility usage data to a network, by using a utility usage sensor to acquire data representing utility usage; and using
(Continued)

electrical circuitry in the adapter for communicating information from the sensor over a network to a management entity that collects and process the data.

39 Claims, 6 Drawing Sheets

Related U.S. Application Data filed on Mar. 21, 2012, provisional application No. 61/756,336, filed on Jan. 24, 2013.

(51) Int. Cl.
| | |
|---|---|
| H04L 29/06 | (2006.01) |
| G01R 22/06 | (2006.01) |
| H04L 12/24 | (2006.01) |
| H04L 12/26 | (2006.01) |
| H04W 12/08 | (2009.01) |

(52) U.S. Cl.
CPC ............ H04L 41/14 (2013.01); H04L 43/028 (2013.01); H04L 43/06 (2013.01); H04L 43/12 (2013.01); H04L 63/0254 (2013.01); H04L 63/1408 (2013.01); H04L 63/1416 (2013.01); H04W 12/08 (2013.01); H04L 41/22 (2013.01); Y04S 40/164 (2013.01); Y04S 40/168 (2013.01)

(58) Field of Classification Search
CPC .... H04L 63/1408; H04W 24/08; H04W 12/08
USPC ................ 307/9.1, 116; 340/870.01, 870.02, 340/870.03; 455/557, 405; 700/286, 700/295; 702/61, 62, 60
See application file for complete search history.

(56) References Cited

U.S. PATENT DOCUMENTS

| | | | |
|---|---|---|---|
| 6,906,709 B1 | 6/2005 | Larkin et al. | |
| 6,958,977 B1 | 10/2005 | Mitrani et al. | |
| 7,058,524 B2* | 6/2006 | Hayes | G01D 4/004 |
| | | | 340/870.01 |
| 7,174,566 B2 | 2/2007 | Yadav | |
| 7,274,305 B1 | 9/2007 | Luttrell | |
| 7,463,986 B2* | 12/2008 | Hayes | G01D 4/002 |
| | | | 702/62 |
| 7,587,762 B2 | 9/2009 | Singhal et al. | |
| 7,975,046 B2 | 7/2011 | Sheppard | |
| 8,325,057 B2 | 12/2012 | Salter | |
| 8,948,274 B2* | 2/2015 | Vedantham | H04B 3/54 |
| | | | 340/12.32 |
| 9,100,305 B2* | 8/2015 | Hui | H04L 43/0876 |
| 2002/0161536 A1 | 10/2002 | Suh et al. | |
| 2005/0289010 A1 | 12/2005 | Whittington et al. | |
| 2006/0123477 A1 | 6/2006 | Raghavan et al. | |
| 2006/0271314 A1* | 11/2006 | Hayes | G01D 4/002 |
| | | | 702/62 |
| 2007/0063866 A1* | 3/2007 | Webb | G01D 4/004 |
| | | | 340/870.02 |
| 2008/0228908 A1 | 9/2008 | Link et al. | |
| 2009/0116404 A1 | 5/2009 | Mahop et al. | |
| 2009/0138971 A1 | 5/2009 | Butti | |
| 2010/0054128 A1 | 3/2010 | O'Hern | |
| 2010/0138066 A1 | 6/2010 | Kong | |
| 2010/0217549 A1 | 8/2010 | Galvin et al. | |
| 2010/0238003 A1* | 9/2010 | Chan | G01D 4/004 |
| | | | 340/538 |
| 2011/0029655 A1* | 2/2011 | Forbes, Jr. | G06Q 10/00 |
| | | | 709/223 |
| 2011/0035510 A1 | 2/2011 | Alexander | |
| 2011/0082599 A1 | 4/2011 | Shinde et al. | |
| 2011/0202910 A1* | 8/2011 | Venkatakrishnan | G06Q 50/06 |
| | | | 717/171 |
| 2011/0248857 A1 | 10/2011 | Rutherford et al. | |
| 2011/0298301 A1* | 12/2011 | Wong | H04L 12/2827 |
| | | | 307/116 |
| 2012/0124367 A1* | 5/2012 | Ota | H04W 12/04 |
| | | | 713/153 |
| 2012/0173032 A1* | 7/2012 | Pamulaparthy | G01D 4/002 |
| | | | 700/295 |
| 2012/0198551 A1* | 8/2012 | Whitney | H04L 63/1491 |
| | | | 726/23 |
| 2012/0217928 A1* | 8/2012 | Kulidjian | B60L 3/0069 |
| | | | 320/109 |
| 2012/0280833 A1* | 11/2012 | Jonsson | G06F 13/385 |
| | | | 340/870.02 |
| 2013/0090748 A1* | 4/2013 | LaFrance | H01H 71/125 |
| | | | 700/67 |
| 2013/0147272 A1* | 6/2013 | Johnson | H02J 3/36 |
| | | | 307/29 |
| 2013/0227689 A1 | 8/2013 | Pietrowicz et al. | |
| 2013/0301626 A1* | 11/2013 | Frydman | H04W 76/02 |
| | | | 370/338 |
| 2014/0015343 A1* | 1/2014 | Lin | H01R 13/6658 |
| | | | 307/130 |
| 2014/0218010 A1* | 8/2014 | Fulton | H01R 33/90 |
| | | | 324/110 |

OTHER PUBLICATIONS

International Application No. PCT/US2015/013051, International Search Report and Written Opinion, mailing date Jun. 10, 2015.
European Application No. EP 13748518, Supplementary European Search Report, dated Jul. 13, 2015.
International Search Report and Written Opinion dated Apr. 24, 2013 from corresponding International Patent Application No. PCT/US2013/026497, 16 pages.
International Search Report and Written Opinion dated May 3, 2013 from corresponding International Patent Application No. PCT/US2013/026504, 15 pages.

\* cited by examiner

US 9,733,274 B2

MULTI-FUNCTION ELECTRIC METER ADAPTER AND METHOD FOR USE

CROSS-REFERENCED APPLICATIONS

This application claims priority from U.S. provisional patent applications, Ser. No. 61/600,222, filed on Feb. 17, 2012, Ser. No. 61/613,663, filed on Mar. 21, 2012 and Ser. No. 61/756,336, filed on Jan. 24, 2013. All of these applications are incorporated herein by reference, in their entireties, for all purposes.

This application is also related to U.S. utility patent application Ser. No. 13/769,133, entitled Method and System for Packet Acquisition, Analysis and Intrusion Detection in Field Area Networks, filed of even date herewith, which is incorporated herein by reference, in its entirety, for all purposes.

BACKGROUND

1. Field of the Disclosure

The present disclosure relates to data and control networks associated with a smart grid for electrical power distribution. More particularly, it relates to smart meters for use in a field area network (FAN) communications system, or in other applications.

2. Description of the Related Art

Conventional systems for the generation, transmission, and distribution of electricity are well known. A power plant, or other source, generates electricity. The voltage is stepped up for distribution over high voltage transmission lines. The transmission lines are connected to substations, which step the voltage down to some intermediate voltage level. The power at this intermediate voltage level is distributed and further stepped down to a voltage that is delivered to homes and businesses.

Smart Grid is the modernization of the national electrical system to improve efficiency, integrate renewable generation sources, promote conservation, and better measure and manage the generation, transmission, distribution, consumption and potentially the storage of electricity. Much of the new technology in Smart Grid is focused on the electrical distribution network.

Key enablers for Smart Grid technology are intelligent embedded systems and communications in FANs. Intelligent embedded systems are small computer systems incorporated into power components that add sensor, control and monitoring capabilities. FANs enable communications among embedded system controllers and backend applications for measurements and control of Smart Grid components in the operation of the electrical system.

The Advanced Metering Infrastructure (AMI) is considered to be the leading edge of Smart Grid. AMI was the first large scale deployment of Smart Grid technology and involves deploying Smart Meters at every home and Communication Access Nodes or Access Points to support wireless communications among Smart Meters and backend applications. A Smart Meters is essentially a solid state computing and metering device with a network interface card. Smart Meter energy applications include remote meter reading, remote disconnect/connect, outage management, demand response, such as time of use pricing and direct load control, and customer engagement through home area networks (HANs).

Additionally, Smart Grid adds intelligent controls and sensors to distribution transformers, distribution feeders, and distribution substations to monitor asset state and condition, energy flow and to remotely control active components, such as switches, circuit reclosers, and capacitor banks. This portion of Smart Grid is known as Distribution Automation (DA).

Securing a widely distributed AMI or Distribution Automation DA FAN is a significant security challenge. Intelligent endpoints, such as Smart Meters or networked DA equipment, are spread across a wide geographic area. They communicate over wireless channels that can be intercepted and forged or malicious transmissions can be injected. Smart meters and networked DA equipment are difficult to physically protect. The first generation of Smart Meters and networked DA equipment lack critical protections to defend against cyber and physical attacks. Best security practices dictate a layered defense, which includes means to monitor and detect for signs of intrusion and anomalous behavior.

Much of Smart Grid technology is still in its infancy. AMI, DA and FAN system providers are presently consumed by getting their claimed functionality to work. Little to no attention has been given to implementing network monitoring and intrusion detection systems. In addition, because many FANs use proprietary radio systems and protocols, none of the solutions commonly used for IP networks will work. Furthermore, whereas the industry understands the vulnerabilities in IP networks from years of experience, it is still in the discovery period with respect to the vulnerabilities in wide-area FANs.

A multitude of probes within RF signal coverage of the Smart Grid devices under surveillance. A practical concern is the potential difficulty of finding suitable physical locations to install probes on poles, towers, and buildings or vehicles. Installation on poles requires conformance to a number of regulations and safety polices regarding wind load on the pole, minimum distances from power lines, availability of space on the pole, and maintain a climbing path on the pole. In addition, the pole must have a low voltage power line, i.e., 120 or 240 volts, which means it needs to have a distribution transformer or circuit feed from a nearby transformer. Furthermore, poles can be obstructed by trees, contain noisy power electronics that pollute the reception environment. Installation requires up to three special crews to handle installation of the antenna in the high voltage section, connection of the low voltage probe power source, and installation of the probe in the communications section. Probes mounted on buildings require similar engineering to secure the device against wind load, avoid water leaks on rooftops, and locate a convenient power source. Additional concerns are protection of the probes from environmental elements, securing the probes against tampering and providing convenient access to the probes for maintenance and ease of moving probes for system tuning or replacement in the case of probe failure.

Accordingly, there is a great need for a way to leverage more convenient probe locations. The present disclosure proposes a method and apparatus to enable probe installation in existing electric meters locations, or to render existing electric meters capable of supporting a probe for intrusion detection and network monitoring.

SUMMARY

An objective of the present disclosure is to provide a convenient way to deploy probes using the meter sockets on residential and commercial buildings without modifying standard or smart meters, while maintaining a high degree of independence from the devices under surveillance. The probes can be used for intrusion detection, network monitoring or any other application that would benefit from an independent monitoring source located in a meter position.

Also disclosed is a meter adapter that fits in between the meter socket and smart meter. The adapter houses the probe electronics and passes through electrical contacts for power delivery through the meter. The adapter does not interfere with meter operation and allows any meter location to become a convenient probe location.

The disclosure is also directed to adding a broadband communications gateway to a home by embedding a WAN network interface card, such as a cellular data card or broadband power line modem in the adapter and providing local broadband service to the customer through Wi-Fi or broadband over power line.

Also disclosed is adding secondary metering functionality that independently monitors power usage and quality, as well as other utilities at the location, such as water and gas. This can be installed either on behalf of the customer who wants to monitor their power usage and characteristics in greater detail or more frequently than the utility can provide, or by an energy management company, that provides energy management services on behalf of businesses and large customers. The adapter can contain a web server that provides customer access to usage and power information over a local network connection, such as Wi-Fi, Bluetooth, ZigBee, or broadband over power line. The adapter communicates with the energy management center via commercial wireless (e.g., 3G, long term evolution or LTE), fiber power line carrier (PLC), DSL or other wide area networking technology.

A premises security monitoring station in a secure location can be added, to allow a security monitoring company to communicate with detection devices in the home, monitor home power usage and report alarms back to a central monitoring station.

A control to manage water usage at a location and control sprinklers and other uses of water can be added.

An adapter for an electric meter, comprising: a first set of connections for interfacing to a panel box; a second set of connectors for interfacing to the electric meter; and circuitry in the adapter for communicating information over a network to a management entity that collects and processes the data.

The adapter comprises radio electronics to intercept radio frequency (RF) traffic from at least one band selected from the group consisting of: advanced metering infrastructure (AMI) and distribution automation (DA) field area networks (FAN), home area networks (HAN), and any other radio frequency band, wherein the RF traffic is transmitted over the network.

The adapter comprises radio electronics to remotely inject radio frequency (RF) traffic into at least one band selected from the group consisting of: advanced metering infrastructure (AMI) and distribution automation (DA) field area networks (FAN), and any other radio frequency band.

The adapter comprises at least one function selected from the group consisting of: traffic analysis, intrusion detection, and network anomaly detection functions.

The intrusion detection function analyzes intercepted traffic, and detects intrusion and anomalies in advanced metering infrastructure (AMI) and distribution automation (DA) field area networks (FAN), home area networks (HAN), or any other radio frequency band.

The network is at least one selected from the group consisting of: a field area network, a home area network, a wide area network, a power distribution system network, a telephone network and a radio frequency transmission network.

The RF traffic is transmitted over the network via at least one communications channel protocol selected from the group consisting of: Wi-Fi, Zigbee, power line carrier, long term evolution, voice over internet protocol, fixed broadband, and internet protocol.

The adapter is a communications gateway that provides Internet, data and voice services from wireless, fiber, and broadband over power line technologies.

The adapter further comprising sensors for determining electric power quality, and electronic components for communicating data from the sensors to the network.

The adapter further comprising at least one environmental sensor for determining environmental conditions at the adapter, and an electronic component for communicating data from the environmental sensor to the network.

The adapter further comprising a port using an optical, a wireless or a magnetic connection to provide maintenance access.

The adapter further comprising an electrical metering system for transmitting data concerning electrical usage by a specific device. The device is one selected from the group consisting of: an electrical appliance and a car requiring electrical charging.

The adapter further comprising sensors for monitoring, and controls for controlling, utility service usage.

The sensor is a water meter, and the controls include a water shut off valve.

The sensor is a gas flow meter, and the controls include a gas shut off valve.

The sensor is a security sensor that detect motion, pressure, glass-breakage, light, fire, carbon monoxide, natural gas, gun shots or opening of an entryway. The adapter further comprising a temperature sensor that detects an electrical problem with the utility usage meter and a panel box.

The adapter further comprising a control valve, wherein the control valve is a sprinkler valve.

The adapter further comprising an electricity line relay for connecting and disconnecting electricity supplied to the electric meter.

The adapter further comprising power conditioning circuitry for conditioning power to be supplied to the adapter from an electrical distribution system.

A method for supplying information on utility usage to a network, comprising: placing a probe meter adapter between a utility usage meter and a panel box for the meter; intercepting field area network (FAN) traffic from an advanced metering infrastructure (AMI) and distribution automation (DA) field area networks (FAN), home area networks (HAN), or any other radio frequency band; and using electrical circuitry in the probe meter adapter for communicating field area network (FAN) traffic and information from the utility usage meter to the network to collect and process the traffic and information.

The method further comprising injecting the traffic into the advanced metering infrastructure (AMI) and distribution automation (DA) field area networks (FAN) or home area networks (HAN) by remote commands from a management center.

The method further comprising analyzing the traffic via multiple protocol layers to detect malicious packets, signs of intrusion or network anomalies.

The method further comprising using sensors to determine electric power quality, and communicating data on electric power quality from the sensors to the network.

A computer readable non-transitory storage medium storing instructions of a computer program which when executed by a computer system results in performance of steps of a method for transmitting utility usage data to a network, comprising: placing a probe meter adapter between a utility usage meter and a panel box for the meter; intercepting field area network (FAN) traffic from an advanced metering infrastructure (AMI) and distribution automation (DA) field area networks (FAN), home area networks (HAN), or any other radio frequency band; and using electrical circuitry in the probe meter adapter for communicating field area network (FAN) traffic and information from the utility usage meter to the network to collect and process the traffic and information.

Thus, the disclosure is directed to an adapter for an electric meter, including a first set of connections for interfacing to a meter panel box, a second set of connectors for interfacing to the electric meter; and circuitry in the adapter for communicating information intercepted from RF FAN communications or local metering and sensor data to a network to collect and process the data.

The network is at least one selected from the group consisting of: a field area network, a home area network, a wide area network, a power distribution system network, a telephone network, and a radio frequency transmission network.

The adapter communicates with the energy management center via commercial wireless channel protocol selected from the group consisting of: Wi-Fi, Zigbee, power line carrier, 4G/long term evolution (LTE), voice over internet protocol, fixed broadband, IP, and a combination thereof.

The adapter further comprises sensors for determining electric power quality, and electronic components for communicating data from the sensors to the network. An environmental sensor determines environmental conditions at the adapter.

The adapter can include an electrical metering system for transmitting data concerning electrical usage by a specific device. The device can be one selected from the group consisting of an electrical appliance, such as a car requiring electrical charging.

The adapter can include an electrical metering system for transmitting data concerning electrical usage by a specific device. The device can be one selected from the group consisting of an electrical appliance and a car requiring electrical charging.

The adapter can include sensors for monitoring and controls for controlling, utility usage, including gas, water and electricity, and shut off devices for each, including sprinkler valves.

The adapter can include radio electronics to intercept FAN or other traffic in one or more radio frequency bands.

The adapter can include an intrusion detection function to analyze intercepted traffic and detect intrusion and anomalies in the AMI, DA or HAN FAN The adapter can further comprise power conditioning circuitry for conditioning power to be supplied to the adapter from an electrical distribution system.

The disclosure is also directed to a method for supplying information on utility usage to a network, comprising placing a probe meter adapter between a utility usage meter and a panel box for the meter, and using electrical circuitry in the adapter for communicating information from a FAN or utility meter to a network to collect and process the data.

The network is at least one selected from the group consisting of a field area network, a home area network, a wide area network, a power distribution system network, a telephone network, and a radio frequency transmission network.

An electrical metering system is used to acquire data concerning electrical usage by a specific device, and the data concerning electrical usage by the specific device is transmitted to the network.

The method further comprises using sensors to determining electric power quality, and communicating data on electric power quality from the sensors to the network.

The method further comprises using environmental sensors for determining environmental conditions at the adapter, and communicating data from the environmental sensors to the network.

The method further comprises using a sensor for monitoring and controls for controlling utility usage, wherein the sensor is a water meter and the controls include a water shut off valve.

The method further comprises using a sensor for monitoring and controls for controlling utility usage, wherein the sensor is a gas flow meter and the controls include a gas shut off valve.

The method further comprises using radio electronics to intercept FAN or other traffic from one or more RF bands, and transmitting packets upon command.

The method further comprising the analysis of the intercepted traffic to perform intrusion and anomaly detection in the AMI, DA or HAN FAN.

An electricity line relay is used for connecting and disconnecting electricity supplied to the electric meter.

Power supplied to the adapter from an electrical distribution system is conditioned.

The disclosure is also directed to a computer readable non-transitory storage medium storing instructions of a computer program which when executed by a computer system results in performance of steps of a method for transmitting utility usage data to a network, comprising using a utility usage sensor to acquire data representing utility usage; and using electrical circuitry in the adapter for communicating information from the sensor to a network to collect and process the data.

A component or a feature that is common to more than one drawing is indicated with the same reference number in each of the drawings. When such component or feature performs the same function as previously described, to avoid repetition, it is usually described again or referred to only in general terms.

DESCRIPTION OF THE PREFERRED EMBODIMENTS

Figure 1:
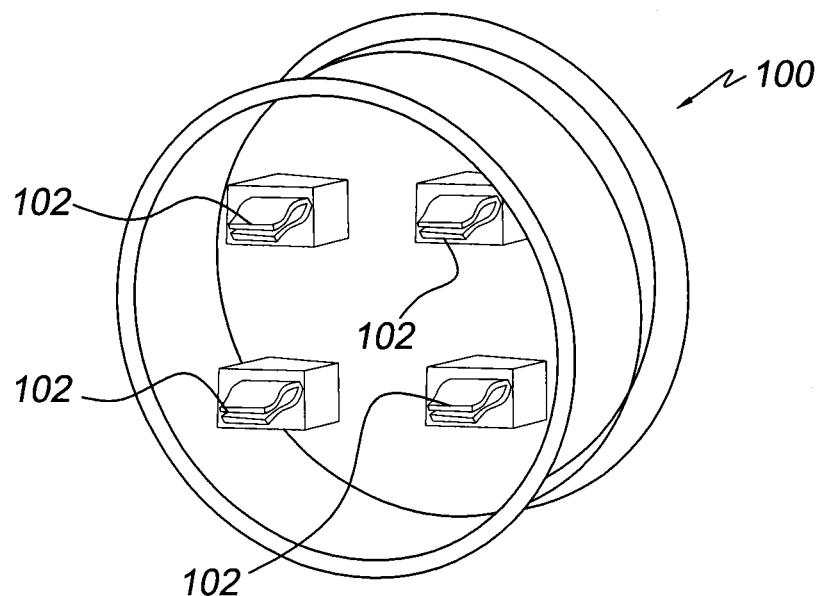
FIG. 1 is a perspective view of a conventional meter adapter used for form conversion or surge suppression.
Figure 2:
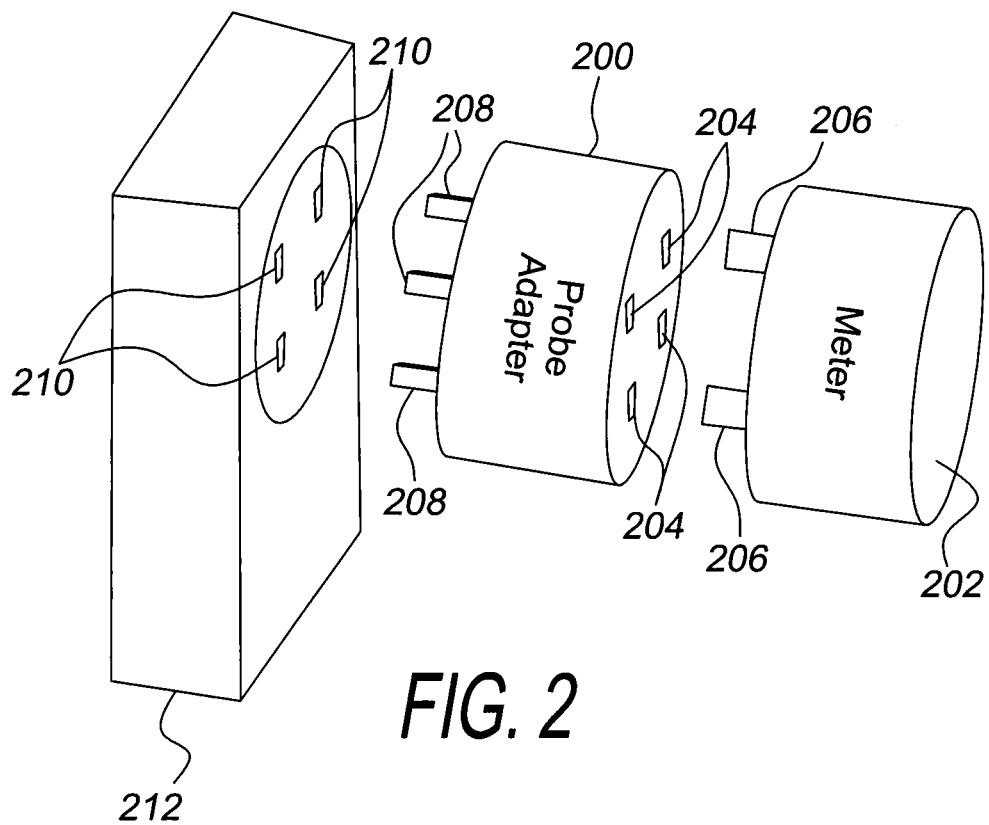
FIG. 2 is an exploded perspective view of a probe meter adapter between a conventional meter panel and an electric meter.

FIG. 1 is a perspective view of a conventional, commercially available meter adapter 100 which is often used for panel-to-meter form conversion or has circuitry therein (not shown in FIG. 1) for surge suppression. A series of pairs of electrical conductive connection clips 102 (four in the case of most meter adapters) accepts electrically conductive blades extending from the back of an electrical meter (FIG. 2). A series of electrically conductive blades (not shown in FIG. 1) extends from the back of adapter 100, and is accepted into a socket on a panel box (FIG. 2) of a home or commercial building. This type of adapter allows the utility to change meter plug configuration without forcing the customer to replace his/her meter panel.

Referring to FIG. 2, a probe adapter 200 for an electrical meter 202 may have a series of openings 204 for receiving a series of electrically conductive blades 206 extending from the back of electrical meter 202. A series of electrically conductive blades 208, extending from the back of adapter probe 200, are received in a series of openings 210 in a panel box 212. Physically and from an external view the probe adapter 200 is similar to prior art meter form conversion adapters. Functionally, probe adapter 200 introduces new capabilities and uses not present in prior art implementations.

Figure 3:
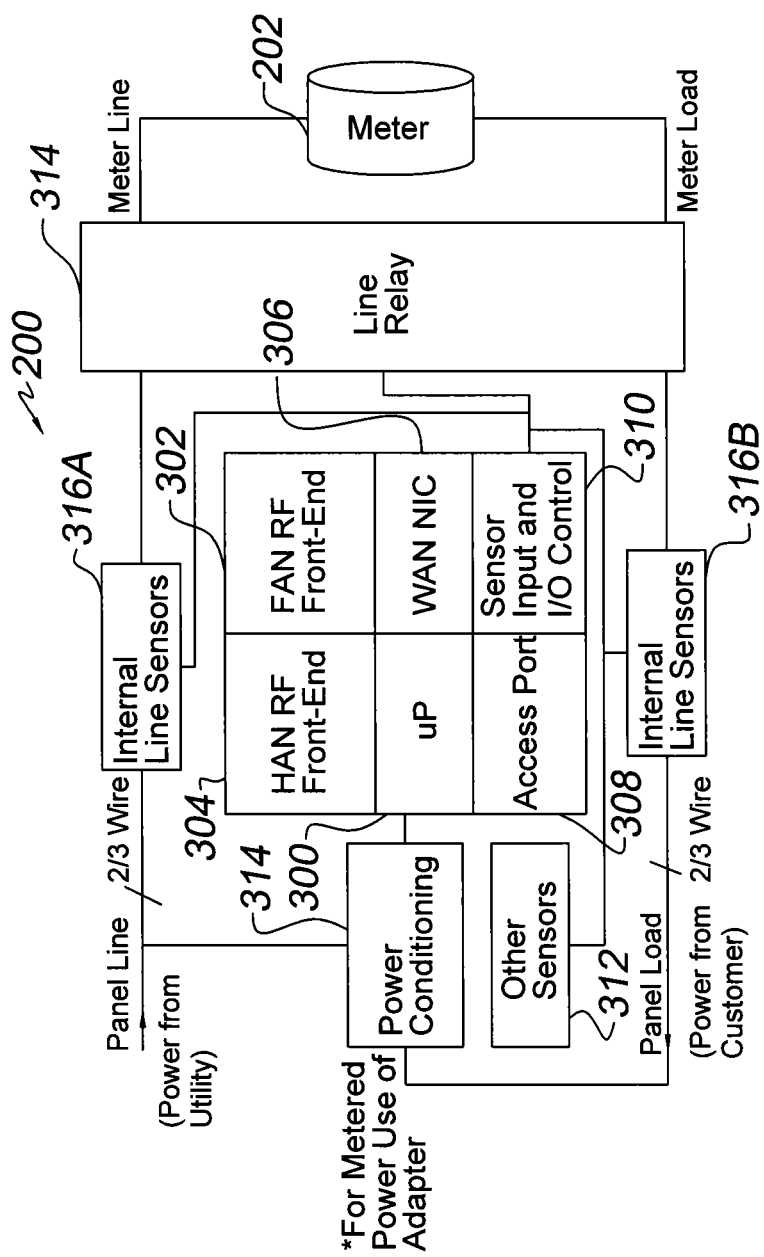
FIG. 3 is a block diagram of an electric meter connected to a probe adapter in accordance with the present disclosure.

In FIG. 3, the preferred implementation of the meter probe adapter 200 includes a combination probe; power conditioning and safety electronics; optional sensors; and an optional power relay.

The combination probe portion of meter probe adapter 200 includes a number of subcomponents. Probe intelligence is provided by a microprocessor 300, which is typically a RISC-based device such as a commercially available ARM processor (available from Advanced RISC Machines, Ltd.) with sufficient processing power and peripheral interfaces to analyze packets and connect to the various sensors and devices required by the circuitry of meter probe adapter 200. A first RF front end 302 is incorporated to enable meter probe adapter 200 to access over-the-air traffic in the FAN and, in combination with firmware logic in microprocessor 300, passively monitor and analyze FAN traffic and inject traffic upon remote command. Current implementations of AMI FANs typically use the 900 MHz industrial, scientific and medical (ISM) frequency band. A second RF front end 304 is incorporated to enable the meter probe adapter 200 to access over-the-air traffic in the home area network (HAN) and, in combination with firmware logic in the microprocessor 300, passively monitor and analyze HAN traffic and inject traffic upon remote command. Current implementations of HANs use the 2.4 GHz band with the ZigBee protocol.

Smart meters typically act as a transitional router or gateway for utilities to communication with HAN devices. The meter probe adapter 200 also includes a wide area network (WAN) network interface card (NIC) 306 over which it communicates with back end probe management applications, event-reporting systems, packet analyzer applications, IDSs and can continuously stream or upload in store and forward mode or on command FAN or HAN packet captures. An example of such a system is described in copending U.S. patent application Ser. No. 13/769,133, filed on the same date hereof and incorporated by reference in its entirety. The WAN NIC 306 can support commercial wireless (e.g., 3G/GSM/LTE), power line carrier (PLC) for cases where the utility has PLC nodes in the distribution network, Wi-Fi for cases where the connection maybe provided by the customer's broadband connection, ZigBee for cases where the connection hops to a gateway over ZigBee, or fixed broadband access such as DSL and fiber. In addition, Bluetooth and Wi-Fi can be used to transfer information that the meter probe adapter 200 has captured and stored for walk-up or drive-by collection systems. An access port 308 is provided to allow maintenance access to the meter probe adapter 200, using either a physical optical connection (for safety) or short range wireless connection via Bluetooth or a magnetic dongle. Sensor inputs and Input/Output controls 310 are included in the meter probe adapter 200 to permit collection of various power, environmental, and security data as well as operate controls in the meter probe adapter 200, as received from sensors 312.

Power for the probe meter adapter electronics is advantageous sourced directly from the panel line connection, thereby eliminating the possibility of a compromised smart meter from removing or disabling power to the probe meter adapter 200. Power conditioning and safety electronics 314 convert the panel line source voltage into a voltage compatible with the probe electronics, other sensors 312 and a line relay 314, which upon receipt of a remote command received from the WAN NIC 306 and processed by the microprocessor 300, can cut off electricity. Fuses and lightning surge protection (not shown) are incorporated to handle possible malfunction in the meter probe adapter electronics and to handle line surges that may destroy the meter probe electronics. These protection mechanisms are known and commonly used by those skilled in the art.

Optional sensors can be included in the other sensors 312 of the meter probe adapter 200 to monitor power, environmental and security data. Line sensors 316A and 316B are used on both the panel line and panel load connections, respectively, to monitor power quality, such as voltage, current, and phase. As is well known, electricity from the power line is supplied to the load via the meter 202. The sensor information can be used to verify the reading provided by the smart meter or detect attacks on the smart meters, such as cyber-attacks, which may have compromised the smart meter firmware to report incorrect data in an attempt to harm the system or simply to enable theft of power or concealment of power usage. Environmental sensors measure typical weather conditions such as temperature, humidity, and available light. This information may be useful to correlate with equipment failures detected in probe traffic, such as frequency drifts in channel carrier of FAN devices and smart grid devices unexpectedly rebooting. It is also useful for device prognostics to estimate the impact of environmental conditions on device useful life and for prognostics and condition-based maintenance instead of the traditional run-to-failure approach traditionally used by most utilities. Specifically, a temperature sensor in the meter probe adapter can detect a condition known as a "hot socket" where the flow of electricity through the meter and panel is generating excessive heat and could result in a meter fire. Sensors can also be provided to detect evidence of physical tampering, such as removal of the meter probe adapter 200 from the panel 212 or removal of the smart meter 202 from the meter probe adapter 200. Wireless sensors are preferred for improved safety because there is no physical connection to the meter electronics.

An optional power line relay 314 is provided to enable the probe to disable power to the site upon command from a back-end management system, as described in co-pending U.S. utility patent application Ser. No. 13/769,133, entitled Method and System for Packet Acquisition, Analysis and Intrusion Detection in Field Area Networks, filed of even date herewith.

Figure 4:
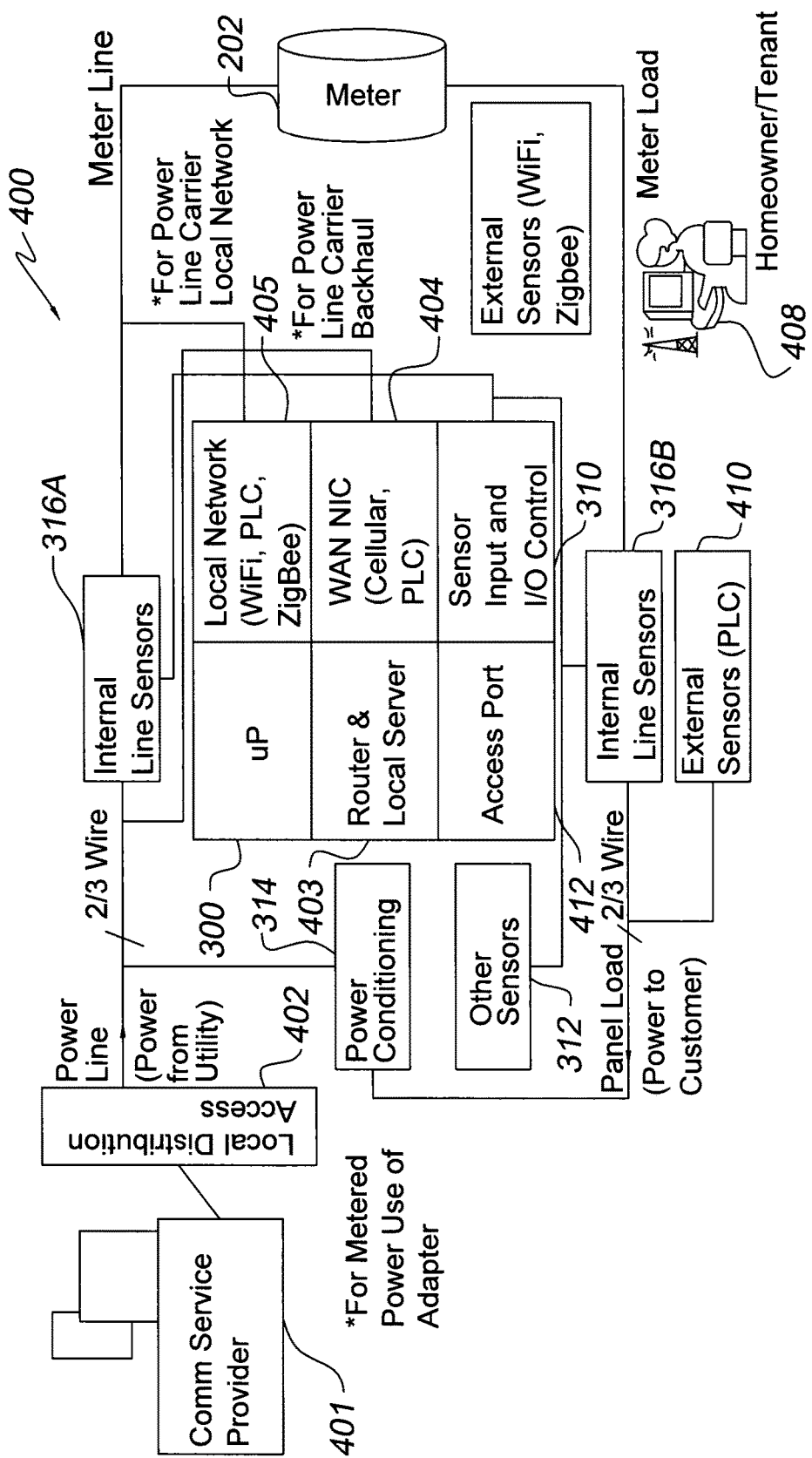
FIG. 4 is a block diagram of a probe meter adapter, in accordance with the disclosure herein, that provides a broadband gateway for Internet and VoIP services.

FIG. 4 illustrates how a meter adapter 400 can house a broadband gateway to provide Internet and VoIP services to a customer. The communications service provider 401 connects to the meter adapter gateway through a wide area network, such as cellular data (e.g., 3G, LTE) or PLC via local distribution access 402. Inside the meter adapter 400, a router/local server function 403 connects the WAN broadband access network interface card WAN NIC 404 to one or more local networks by communication paths, such as WiFi, PLC and ZigBee, as represented at 405. In the preferred implementation, the local area network is WiFi, thus facilitating an easy method for the customer to connect the customer's computing equipment 408. Router/local server function 403 in the meter adapter 400 allows the customer to check the status and modify settings, as allowed by the service provider 401. Line sensors 316A and 316B serve functions as described above with respect to FIG. 3. Various external sensors 410 can provide data via WiFi, PLC, or Zigbee. An external access port 412 is also provided to allow maintenance access to the adapter, using either a physical optical connection (for safety) or short range wireless connection via Bluetooth or a magnetic dongle.

Figure 5:
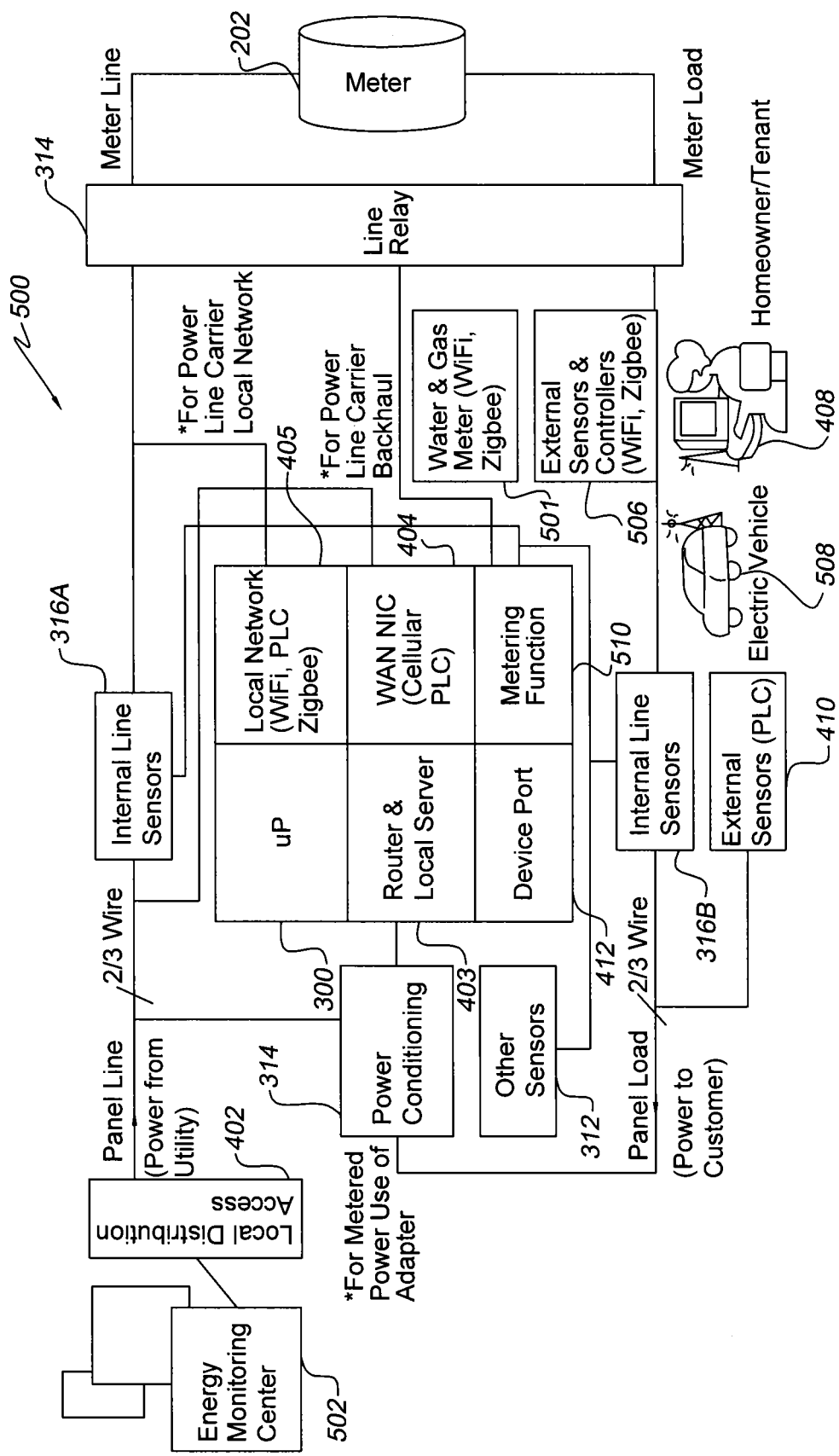
FIG. 5 is a block diagram of a probe meter adapter, in accordance with the disclosure herein, that provides secondary metering and third party energy management service.

FIG. 5 illustrates how a meter adapter 500 can house a secondary metering and third party energy management service to allow a customer to 1) monitor their own energy usage at more granular levels than provided by the electric utility; 2) monitor other utilities such as gas and water via water and gas meters 501; and 3) allow a third party energy management company to monitor utility usage and control relays and switches in the home through a local area network to remotely manage utility usage on behalf of the homeowner. The energy management provider's energy monitoring center 502 connects to the meter adapter gateway through a wide area network, such as cellular data (e.g., 3G, LTE) or PLC via local distribution access 402. Inside the meter adapter 500, a router connects the WAN broadband access to one or more local network methods, such as WiFi, PLC and ZigBee, where wireless and PLC connected external sensors and controllers 506 that are connected to various appliances can be managed. A router/local server function 403 in the meter adapter 500 allows the customer, with the use of computer equipment 408, to check the energy usage and power quality via a metering function 510, and to modify settings allowed by the energy management provider. Line relay 314 also allows the customer or energy management provider to disconnect customer power.

A variation of this application involves installing a secondary meter through the meter adapter 500 to monitor heavy electric usage, such as for an electric vehicle 508. Any heavy electrical demand appliance can signal meter adapter 500 via the local area network that it is actively consuming power. The secondary metering function allows tracking of usage by device, a capability not presently possible with smart meter implementations. Instead of billing by time-of-use, the secondary meter allows billing by appliance and time-of-use, which is beneficial to avoid penalizing certain demographic groups who may be dependent upon certain energy consuming devices with a blanket time-of-use policy. For instance, elderly people may require air conditioning at peak pricing intervals, but should not be unfairly charged peak rates since the usage may be life-critical. However, if they turn on their pool heater during peak intervals, they should be charged peak rates.

Figure 6:
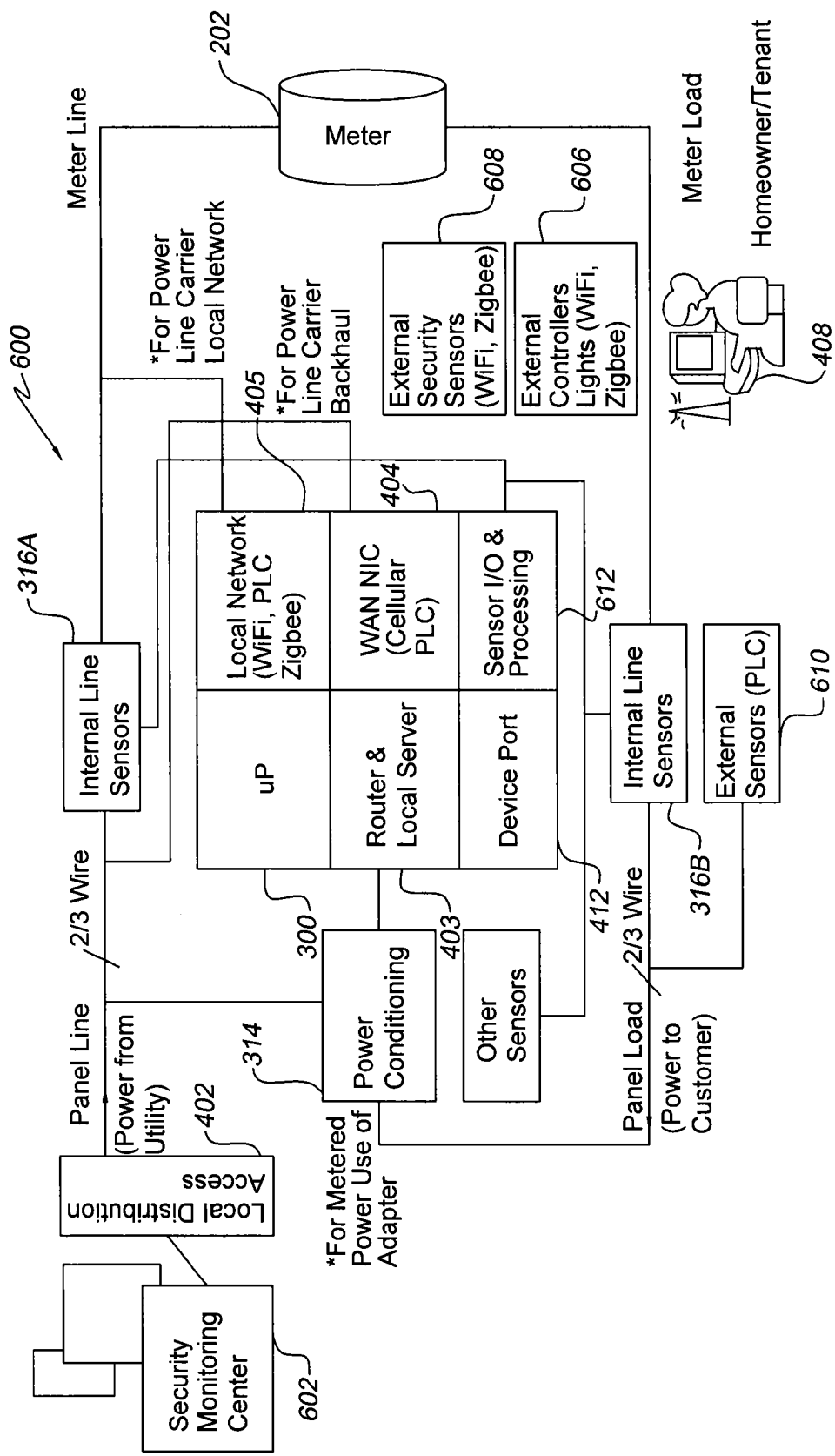
FIG. 6 is a block diagram of a probe meter adapter, in accordance with the disclosure herein, that provides for premises security monitoring.

FIG. 6 illustrates how a meter adapter 600 can house a security monitoring station in a well-protected location. The security monitoring center 602 of the security monitoring provider connects to the meter adapter gateway through a wide area network, such as cellular data (e.g., 3G, LTE) or PLC via local distribution access 402. Inside meter adapter 600, a router connects the WAN broadband access via one or more local network connections 405, such as WiFi, PLC and ZigBee, where wireless and PLC sensors 410 and controllers 606 that are connected to various external security sensors 608 and appliances can be managed. A router/local server function 403 in the meter adapter 600 allows the customer to check the security status and modify settings allowed by the security monitoring provider via the customer's computer equipment 408. External security sensors 610 and their controllers 606 include door and window sensors, fire and smoke detection, carbon monoxide (CO) detection, water leak detection, flood detection, temperature, moisture and motion or pressure sensitive devices, and various actuators for home automation, such as being able to open a door remotely in case the homeowner gets locked out. Sensor I/O functions and their processing are performed by a module 612 to interface and make sensor data available to the uP 300.

Figure 7:
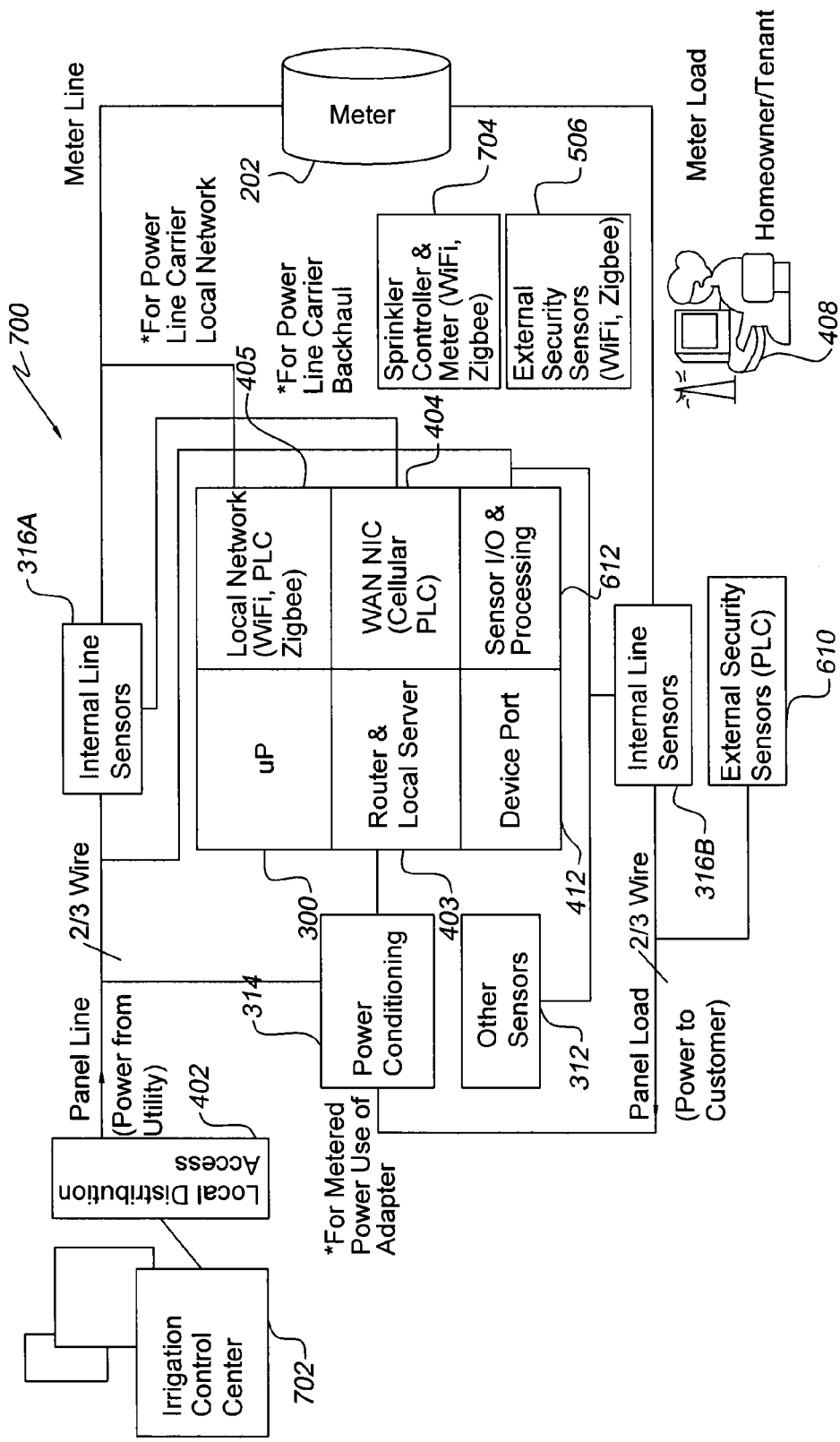
FIG. 7 is a block diagram of a probe meter adapter, in accordance with the disclosure herein, that provides sprinkler and irrigation management.

FIG. 7 illustrates how a meter adapter 700 can house electronics for remote sprinkler/irrigation management. An irrigation control center 702 of a sprinkler/irrigation provider connects to the meter adapter gateway through a wide area network, such as cellular data (e.g., 3G, LTE) or PLC. Inside meter adapter 700, a router connects the WAN broadband access to one or more local network communication paths, such as WiFi, PLC and ZigBee, where wireless and PLC interfaces connect to a sprinkler controller 704 on the premises. A router/local server 403 function in meter adapter 700 allows the customer to check the irrigation status and modify settings allowed by the sprinkler/irrigation provider. A water cut off valve may be controlled by meter adapter 700, with remote instructions from the irrigation control center 702 or the customer's computer equipment 408. The sprinkler/irrigation provider can be a commercial company or even the local township, which wants to enforce water conservation, especially during times of drought.

In general, meter probe adapter 700 provides a novel, simple, convenient, easily installable, easily maintainable, multi-purpose, and low cost method to deploy probes in the field to intercept an collect communications from AMI, DA, HAN and other Smart Grid FANs and local sensor data. The probes can be extended to the networks outside utility usage if desired, such as monitoring signals in foreign (non-utility) networks.

In general, the meter probe adapter allows any meter panel to become a convenient location for a FAN probe. The meter probe adapter can support not only AMI networks and HANs, but also house probe equipment for other utility FANs where a meter location is a convenient and advantageous location to position the probe. The meter probe adapter eliminates the need to find new suitable locations for FAN probes. Existing meter locations can be reused, of which there are many that are easily accessible and some that have good RF signal reception characteristics for FANs. In addition, the meter probe adapter provides convenient access to power for the probe and eliminates external power cables. All hardware and electronics are safely packaged inside the adapter housing without any external evidence that the adapter contains a network surveillance capability. The housing is made of a material, such as plastic or polycarbonate, which withstands environmental effects, resists cracking, resists physical attack, and permits RF signals to penetrate the housing without significant signal loss. An optional external antenna can be connected to improve signal reception. Since meters are most often located at or near ground level to permit manual meter reading, the meter probe adapter permits maintenance access to the probe without the need for special equipment or trucks. Additionally, the meter probe adapter enables FAN/HAN probes to be deployed at meter locations without modifying a smart meter or having to procure specially equipped smart meters, which could be expensive because of their relatively low volume.

There are other benefits of the meter probe adapter. Since the probe is located essentially in the exact same geographic location as a smart meter, the probe meter adapter offers the benefit of allowing utility engineering and operations personnel to compare FAN performance between the smart meter and the probe. Initially upon installation, a baseline record can be made of the RF and network performance of the probe relative to the smart meter. Changes noted over time could be indicative of smart meter or probe wireless network performance degradation. Additionally, since the probe does not rely upon the smart meter for any resources, such as power, the probe maintains separation from the smart meter and can be used as an independent device to monitor the FAN to mitigate supply chain integrity threats as well as clandestine cyber-attacks, which may not be reported by smart meter diagnostics and event reporting functions. Although the meter probe adapter can possess its own tamper sensors, the advantageous co-location of the probe with a smart meter allows meter security events to indicate possible tampering with the probe. For an attacker to get physical access to the probe, the meter or assembly of meter probe adapter and meter needs to be removed, which will cause most smart meters to immediately send a report of power loss.

Similar advantages for access to power, physical protection, and easy maintenance access also apply for the other applications described herein.

The disclosed embodiments can be implemented as a physical adapter that can be procured by utilities and manufactured by meter providers or third parties who build products for the utility/energy sector.

It will be understood that the disclosure may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. An adapter for an electric meter, comprising:
a first set of connections for interfacing to a panel box;
a second set of connectors for interfacing to the electric meter; and
circuitry in the adapter for communicating information comprising field area network (FAN) traffic, intercepted from a first network over a second network, wherein at least one band of the first network comprises a field area network, to a management entity that collects and processes the data, wherein the adapter is communicatively coupled to the first network and the second network, and wherein the adaptor comprises radio electronics to intercept, monitor and analyze the FAN traffic on the first network and to inject radio frequency (RF) traffic into the first network, based on obtaining a remote command from the management entity over the second network, wherein the adaptor further comprises an intrusion detection function to detect intrusions and network anomalies by analyzing intercepted traffic from the field area network of the first network.

2. The adapter of claim 1, wherein said adapter comprises radio electronics to intercept radio frequency (RF) traffic from at least one band of the first network selected from the group consisting of: the field area network, wherein the field area network comprises an advanced metering infrastructure (AMI) and distribution automation (DA) field area network (FAN), a home area network (HAN), and another radio frequency band, wherein said RF traffic is transmitted over said network.

3. The adapter of claim 2, wherein injecting radio frequency (RF) traffic into the first network comprises injecting the radio frequency (RF) traffic into at least one band of the first network selected from the group consisting of: the field area network (FAN), and the other radio frequency band.

4. The adapter of claim 1, wherein said intrusion detection function further analyzes intercepted traffic, and detects intrusion and anomalies in a home area network (HAN), or in another radio frequency band.

5. The adapter of claim 1, wherein said adapter is a probe.

6. The adapter of claim 2, wherein the first network comprises at least one other band selected from the group consisting of: a home area network, a wide area network, a power distribution system network, a telephone network and a radio frequency transmission network.

7. The adapter of claim 6, wherein said RF traffic is transmitted over said first network via at least one communications channel protocol selected from the group consisting of: Wi-Fi, Zigbee, power line carrier, long term evolution, voice over internet protocol, fixed broadband, and internet protocol.

8. The adaptor of claim 1, wherein said adapter is a communications gateway that provides Internet, data and voice services from wireless, fiber, and broadband over power line technologies.

9. The adapter of claim 1, further comprising sensors for determining electric power quality, and electronic components for communicating data from the sensors to the network.

10. The adapter of claim 1, further comprising at least one environmental sensor for determining environmental conditions at said adapter, and an electronic component for communicating data from said environmental sensor to said network.

11. The adapter of claim 1, further comprising a port using an optical, a wireless or a magnetic connection to provide maintenance access.

12. The adapter of claim 1, further comprising an electrical metering system for transmitting data concerning electrical usage by a specific device.

13. The adapter of claim 12, wherein said device is one selected from the group consisting of: an electrical appliance and a car requiring electrical charging.

14. The adapter of claim 1, further comprising sensors for monitoring, and controls for controlling, utility service usage.

15. The adapter of claim 14, wherein said sensor is a water meter, and the controls include a water shut off valve.

16. The adapter of claim 14, wherein the sensor is a gas flow meter, and the controls include a gas shut off valve.

17. The adapter of claim 14, wherein said sensor is a security sensor that detect motion, pressure, glass-breakage, light, fire, carbon monoxide, natural gas, gun shots or opening of an entryway.

18. The adapter of claim 1, further comprising a temperature sensor that detects an electrical problem with said utility usage meter and a panel box.

19. The adapter of claim 17, further comprising a control valve, wherein said control valve is a sprinkler valve.

20. The adapter of claim 1, further comprising an electricity line relay for connecting and disconnecting electricity supplied to the electric meter.

21. The adapter of claim 1, further comprising power conditioning circuitry for conditioning power to be supplied to the adapter from an electrical distribution system.

22. A method for supplying information on utility usage to a first network, comprising:
placing a probe meter adapter between a utility usage meter and a panel box for the meter, intercepting field area network (FAN) traffic from an advanced metering infrastructure (AMI) and distribution automation (DA) field area networks (FAN), home area networks (HAN), or any other radio frequency band comprising a second network, wherein at least one band of the second network comprises a field area network;
using electrical circuitry in the probe meter adapter for analyzing intercepted traffic from the field area network to detect intrusions and network anomalies in the field area network;
using the electrical circuitry in the probe meter adapter for communicating field area network (FAN) traffic and information, the information comprising results of analyzing the intercepted traffic from said utility usage meter to said first network to collect and process said traffic and information; and
injecting, by the adaptor, radio frequency (RF) traffic into the second network, based on obtaining a remote command from the management entity over the first network.

23. The method of claim 22, wherein the second network comprises at least one other band selected from the group consisting of: a home area network, a wide area network, a power distribution system network, a telephone network and a radio frequency transmission network.

24. The method of claim 22, wherein said traffic is transmitted over said first network via at least one communications channel protocol selected from the group consisting of: Wi-Fi, Zigbee, power line carrier, long term evolution, voice over internet protocol, fixed broadband, and internet provider.

25. The method of claim 22, wherein probe meter adapter provides Internet, data and voice services from wireless, fiber, and broadband to be transmitted over power line technologies.

26. The method of claim 22, wherein injecting further comprises injecting said traffic into said advanced metering infrastructure (AMI) and distribution automation (DA) field area networks (FAN) or home area networks (HAN) by remote commands from a management center.

27. The method of claim 22, wherein the analyzing further comprises analyzing via multiple protocol layers to detect malicious packets.

28. The method of claim 22, further comprising using sensors to determine electric power quality, and communicating data on electric power quality from the sensors to the first network.

29. The method of claim 22, further comprising using environmental sensors for determining environmental conditions at the adapter, and communicating data from the environmental sensors to the first network.

30. The method of claim 22, further comprising using optical, wireless or a magnetic connection via a port to provide maintenance access.

31. The method of claim 22, further comprising using an electrical metering system for acquiring data concerning electrical usage by a specific device, and transmitting the data concerning electrical usage by the specific device to the first network.

32. The method of claim 22, further comprising using a sensor for monitoring and controls for controlling utility usage, wherein the sensor is a water meter and the controls include a water shut off valve.

33. The method of claim 32, wherein said sensor is a gas flow meter, and the controls include a gas shut off valve.

34. The method of claim 22, further comprising using a security sensor that detects motion, pressure, glass-breakage, light, fire, carbon monoxide, natural gas, gunshots or opening of an entryway.

35. The method of claim 22, further comprising a temperature sensor that detects an electrical problem with said utility usage meter and a panel box.

36. The method of claim 22, further comprising a control valve, wherein said control valve is a sprinkler valve.

37. The method of claim 22, further comprising using an electricity line relay for connecting and disconnecting electricity supplied to the utility usage meter.

38. The method of claim 22, further comprising conditioning power to be supplied to said probe meter adapter from an electrical distribution system.

39. A non-transitory computer readable storage medium storing instructions of a computer program which when executed by a computer system results in performance of a method for transmitting utility usage data to a first network, comprising:
placing a probe meter adapter between a utility usage meter and a panel box for the meter, intercepting field area network (FAN) traffic from an advanced metering infrastructure (AMI) and distribution automation (DA) field area networks (FAN), home area networks (HAN), or any other radio frequency band comprising a second network, wherein at least one band of the second network comprises a field area network;
using electrical circuitry in the probe meter adapter for analyzing intercepted traffic from the field area network to detect intrusions and network anomalies in the field area network;

using the electrical circuitry in the probe meter adapter for communicating field area network (FAN) traffic and information, the information comprising results of analyzing the intercepted traffic from said utility usage meter to the first network to collect and process said traffic and information from the second network; and injecting by the adaptor, radio frequency (RF) traffic into the second network, based on obtaining a remote command from the management entity over the first network, based on obtaining a remote command from a management entity over the network.

* * * * *